US008818981B2

(12) United States Patent
Aftab et al.

(10) Patent No.: US 8,818,981 B2
(45) Date of Patent: Aug. 26, 2014

(54) PROVIDING INFORMATION TO USERS BASED ON CONTEXT

(75) Inventors: Omar Aftab, Kirkland, WA (US); Syed Mansoor Jafry, Kirkland, WA (US); Taqi Jaffri, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 155 days.

(21) Appl. No.: 12/905,323

(22) Filed: Oct. 15, 2010

(65) Prior Publication Data

US 2012/0095979 A1  Apr. 19, 2012

(51) Int. Cl.
*G06F 7/00* (2006.01)
*G06F 17/30* (2006.01)

(52) U.S. Cl.
USPC ............................. 707/706; 707/723; 707/732

(58) Field of Classification Search
CPC ..................... G06F 17/30867; G06F 17/30386; G06F 17/3053; G06F 17/3087; G06F 17/300041; G06F 17/300044
USPC .......................................... 707/706, 723, 732
See application file for complete search history.

(56) References Cited

U.S. PATENT DOCUMENTS

| 7,031,724 | B2* | 4/2006 | Ross et al. ................. 455/456.1 |
| 7,539,747 | B2 | 5/2009 | Lucovsky et al. |
| 2002/0055924 | A1* | 5/2002 | Liming ......................... 707/100 |
| 2002/0087674 | A1* | 7/2002 | Guilford et al. .............. 709/223 |
| 2003/0135493 | A1* | 7/2003 | Phelan et al. ..................... 707/3 |
| 2004/0107143 | A1* | 6/2004 | Niemi ............................. 705/26 |
| 2004/0203919 | A1* | 10/2004 | Ross et al. ................. 455/456.1 |
| 2005/0039135 | A1* | 2/2005 | Othmer et al. ................ 715/774 |
| 2005/0188078 | A1* | 8/2005 | Kotzin et al. ................. 709/224 |
| 2006/0073812 | A1* | 4/2006 | Punaganti Venkata et al. ......................... 455/412.1 |
| 2006/0184617 | A1* | 8/2006 | Nicholas et al. ............. 709/203 |
| 2006/0236258 | A1* | 10/2006 | Othmer et al. ................ 715/774 |
| 2006/0271560 | A1* | 11/2006 | Mitchell ......................... 707/10 |
| 2007/0202844 | A1* | 8/2007 | Wilson et al. ............. 455/404.2 |
| 2007/0219985 | A1 | 9/2007 | Aravamudan et al. |
| 2008/0167015 | A1 | 7/2008 | Vishwanathan et al. |
| 2008/0201305 | A1 | 8/2008 | Fitzpatrick et al. |

(Continued)

FOREIGN PATENT DOCUMENTS

CN 101779180 A 7/2010

OTHER PUBLICATIONS

Naaman, et al., "Is it Really About Me? Message Content in Social Awareness Streams", Retrieved at <<http://infolab.stanford.edu/~mor/research/naamanCSCW10.pdf>>, Proceedings of the 2010 ACM conference on Computer supported cooperative work, Feb. 6-10, 2010, pp. 5.

(Continued)

*Primary Examiner* — Etienne Leroux
*Assistant Examiner* — Jared Bibbee
(74) *Attorney, Agent, or Firm* — Andrew Sanders; Micky Minhas

(57) ABSTRACT

Selecting and providing context information relevant to a user at a particular time and location. Input parameters such as a location and time are selected. Context information is obtained for the selected location and time based on the input parameters. Exemplary input parameters include a user activity history, user content such as calendar appointments, social networking data, and a state of a computing device of the user (e.g., as collected by sensors of the computing device). The computing device of the user presents the obtained context information to the user at the selected location and time.

20 Claims, 5 Drawing Sheets

(56) References Cited

U.S. PATENT DOCUMENTS

| | | | |
|---|---|---|---|
| 2008/0263024 A1* | 10/2008 | Landschaft et al. | 707/5 |
| 2008/0288435 A1* | 11/2008 | Doss et al. | 706/47 |
| 2009/0005061 A1* | 1/2009 | Ward et al. | 455/456.1 |
| 2009/0030899 A1 | 1/2009 | Tareen et al. | |
| 2009/0037355 A1* | 2/2009 | Brave et al. | 706/45 |
| 2009/0077027 A1 | 3/2009 | King et al. | |
| 2010/0049702 A1 | 2/2010 | Martinez et al. | |
| 2010/0063969 A1 | 3/2010 | Kasargod et al. | |
| 2011/0252061 A1* | 10/2011 | Marks et al. | 707/771 |
| 2011/0307338 A1* | 12/2011 | Carlson | 705/14.64 |
| 2012/0042036 A1* | 2/2012 | Lau et al. | 709/217 |
| 2012/0046068 A1* | 2/2012 | Katpelly et al. | 455/550.1 |
| 2012/0233184 A1* | 9/2012 | Aravamudan et al. | 707/749 |
| 2013/0104221 A1* | 4/2013 | Low et al. | 726/9 |

OTHER PUBLICATIONS

Lee, Alison, "Exploiting Context for Mobile User Experience", Retrieved at <<http://semais.org/papers/Lee.pdf>>, 2010, pp. 1-4.

Gupta, et al., "Delivering an Optimal user-experience across Multiple mobile devices", Retrieved at <<http://www.infosys.com/offerings/products-and-platforms/mConnect/Documents/delivering-optimal-user-experience.pdf>>, Jun. 11, 2010, pp. 8.

"First Chinese Office Action", Received for Application No. 201110329023.3, Mailed Date: Dec. 3, 2013, pp. 14.

* cited by examiner

PROVIDING INFORMATION TO USERS BASED ON CONTEXT

BACKGROUND

Typical users receive a large amount of information such as messages, contact information, and calendar appointments from a number of services including email accounts, social network feeds, instant messaging services, short message service (SMS) messages, telephone calls, and the like. With existing systems, reviewing the information efficiently is difficult for the user, especially when the information is presented to the user on a device with a small form factor such as a mobile telephone or netbook. The existing systems present the material with little or no prioritization or regard to preferences of the user.

Some existing systems attempt to organize the information based on coarse categories such as whether the user is driving, at work, or at home. For example, meeting reminders may be suppressed while the user is at home. However, the existing systems fail to select and present context items that are relevant to the user at a particular time and location.

SUMMARY

Embodiments of the disclosure provide relevant context information to a user. In particular, a location of a computing device of the user is identified, along with a time value associated with the identified location. Relevant context information for the user is obtained based at least on the identified location and the determined time value, along with other parameters such as sensor data in some embodiments. The relevant context information is provided to the user at a time corresponding to the defined time value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure select and provide context information to a user 102 based on relevance to the user 102 at a given time and particular location. In some embodiments, a context engine 202 gathers information such as a communication and activity history, device usage pattern, and preferences of the user 102 as well as external factors such as time of day, current location, nearby people, and social networking feeds to select and provide the relevant context information. The relevant context information may include content and/or suggestions for activities.

Figure 1:
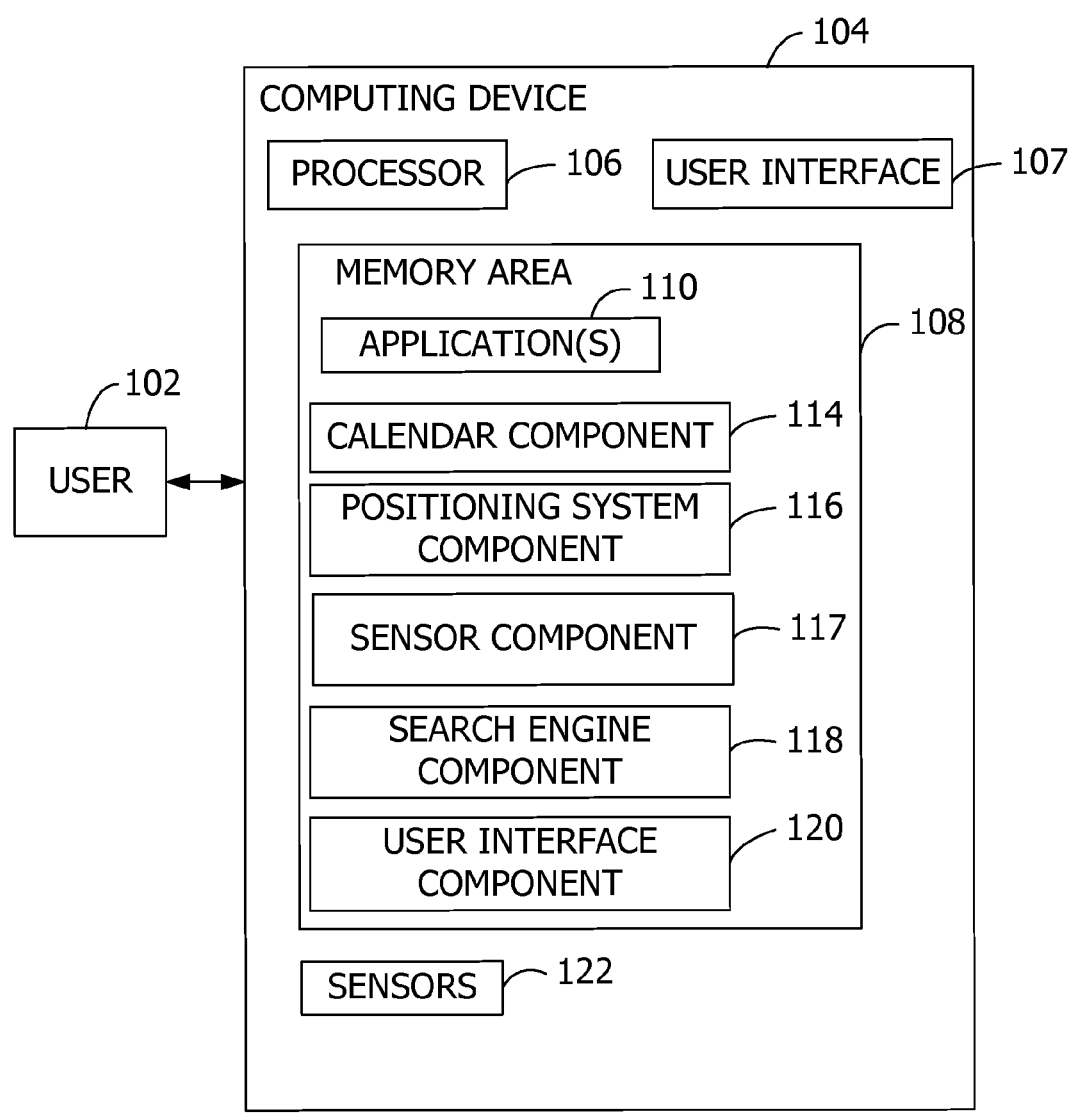
FIG. 1 is an exemplary block diagram illustrating a computing device executing components to provide a user with relevant context items.

Referring again to FIG. 1, an exemplary block diagram illustrates a computing device 104 executing components to provide the user 102 with relevant context items at a selected time. In the example of FIG. 1, the computing device 104 is associated with the user 102. The computing device 104 represents any device executing instructions (e.g., as application programs, operating system functionality, or both) to implement the operations and functionality associated with the computing device 104. The computing device 104 may include a mobile computing device 502 or any other portable device. In some embodiments, the mobile computing device 502 includes a mobile telephone, laptop, netbook, gaming device, and/or portable media player. The computing device 104 may also include less portable devices such as desktop personal computers, kiosks, and tabletop devices. Additionally, the computing device 104 may represent a group of processing units or other computing devices.

The computing device 104 has at least one processor 106, a user interface 107, one or more sensors 122, and a memory area 108. The processor 106 includes any quantity of processing units, and is programmed to execute computer-executable instructions for implementing aspects of the disclosure. The instructions may be performed by the processor 106 or by multiple processors executing within the computing device 104, or performed by a processor external to the computing device 104. In some embodiments, the processor 106 is programmed to execute instructions such as those illustrated in the figures (e.g., FIG. 4).

The user interface 107 includes any interface for communicating with the user 102 of the computing device 104. For example, the user interface 107 may provide content to the user 102 visually (e.g., via a screen such as a touch screen), audibly (e.g., via a speaker), and/or via touch (e.g., vibrations or other movement from the computing device 104). In another example, the user interface 107 may receive from the user 102 tactile input (e.g., via buttons, an alphanumeric keypad, or a screen such as a touch screen) and/or audio input (e.g., via a microphone). In further embodiments, the computing device 104 itself acts as the user interface 107 as the user 102 moves the computing device 104 in a particular way to input commands or manipulate data.

The computing device 104 includes, or receives data from, one or more sensors 122. Exemplary sensors 122 include, but are not limited to, an accelerometer or other motion sensor, a light sensor, a compass or other magnetometer, a gyroscope, a touch sensor, an ambient temperature sensor such as a thermometer, a microphone, a camera, a network card (e.g., Wi-Fi, BLUETOOTH brand communication, etc.), a docking sensor (e.g., whether the computing device 104 is docked to another device or not), and the like. Aspects of the disclosure contemplate selecting relevant context information based on data from one or more of the exemplary sensors 122 and/or one or more of each of the exemplary sensors 122.

The computing device 104 further has one or more computer-readable media such as the memory area 108. The memory area 108 includes any quantity of media associated with or accessible to the computing device 104. The memory area 108 may be internal to the computing device 104 (as shown in FIG. 1), external to the computing device 104 (not shown), or both (not shown).

The memory area 108 stores, among other data, applications 110 that, when executed by the processor 106, operate to perform functionality on the computing device 104. Exemplary applications 110 include mail application programs, web browsers, calendar application programs, and address book application programs. The applications 110 may execute as an applet or other client portion of a web service. Each of the applications 110 may access the context information.

The memory area 108 further stores one or more computer-executable components. Exemplary components include a calendar component 114, a positioning system component 116, a sensor component 117, a search engine component 118, and a user interface component 120. The calendar component 114, when executed by the processor 106 of the computing device 104, causes the processor 106 to select a time value. For example, the calendar component 114 selects the time value based on one or more of the following: an upcoming calendar entry, user activity history, and user preferences. User activity history includes, but is not limited to, a mobility pattern of the user 102 (e.g., where the user 102 has traveled with the computing device 104), a history of application 110 execution on the computing device 104, and any other documentation or description of interaction between the user 102 and the computing device 104. For example, the documentation or description may include, for example, an execution time, execution duration, and execution location of each of the applications 110, as well as the output or results of the execution (e.g., search results, keywords used, calculations, etc.).

The positioning system component 116, when executed by the processor 106 of the computing device 104, causes the processor 106 to determine a location of the computing device 104 at a time corresponding to the time value selected by the calendar component 114. The sensor component 177, when executed by the processor 106 of the computing device 104, causes the processor 106 to collect data from one or more of the sensors 122 associated with the computing device 104. For example, the collected data may indicate movement of the computing device 104 (e.g., via an accelerometer), use of the computing device 104 (e.g., via a touch sensor), environment of the computing device 104 (e.g., via the light sensor, the temperature sensor, etc.), and the like.

The search engine component 118, when executed by the processor 106 of the computing device 104, causes the processor 106 to obtain relevant context information for the user 102 based at least on the time value selected by the calendar component 114, the location determined by the positioning system component 116, and the data collected by the sensor component 117. For example, the search engine component 118 communicates with a web-based search engine to obtain the context information.

The user interface component 120, when executed by the processor 106 of the computing device 104, causes the processor 106 to present the relevant context information obtained by the search engine component 118 to the user 102 only at a time corresponding to the defined time value. For example, the user interface component 120 presents the relevant context information to the user 102 through one or more of the applications 110 executing on the computing device 104 (e.g., where the context information is related to the application 110). For example, for a particular upcoming calendar event, contact information associated with attendees of the event may be provided through a calendar application. In another example, while the user 102 is at a particular location, locations of interest recommended by contacts of the user 102 may be provided to the user 102 through a map application.

In some embodiments, the calendar component 114, the positioning system component 116, the search engine component 118, and the user interface component 120 execute as part of an operating system associated with the computing device 104.

In some embodiments, the applications 110 or user data are stored in the cloud or other storage remote from the computing device 104 so that the user 102 can access the applications 110 and user data from other devices (e.g., as a web service). For example, the user 102 may access the applications 110 and the user data from a mobile telephone, work computer, computer at a library or other facility, gaming console, and/or netbook.

Figure 2:
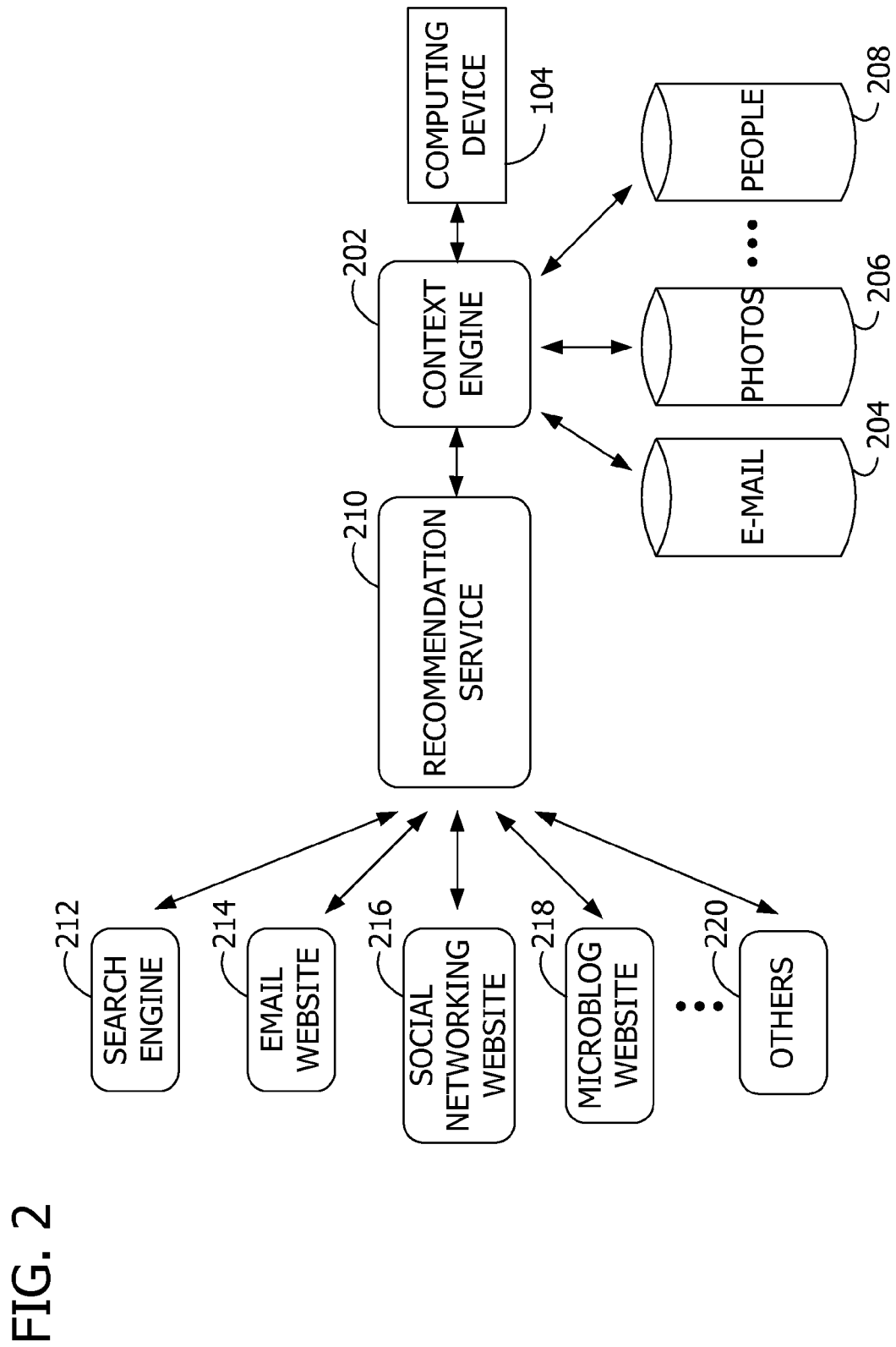
FIG. 2 is an exemplary block diagram illustrating a context engine providing the computing device with relevant context items.

Referring next to FIG. 2, an exemplary block diagram illustrates the context engine 202 providing the computing device 104 with relevant context items. The context engine 202 represents computer-executable instructions that are executed to perform the operations described herein or their equivalent. The context engine 202 may be embodied as a computing device, a web service, or any other hardware and/or software combination. The context engine 202 has access to user content such as e-mail 204, photos 206, people 208 (e.g., contacts), and other content associated with the user 102 of the computing device 104, such as stored in an online data store. The content may be stored separate from the computing device 104 as shown in FIG. 2, or may be stored with the computing device 104 (not shown).

The context engine 202 communicates with a recommendation service 210, which communicates with one or more data sources. The recommendation service 210 may be embodied as a computing device separate from the context engine 202, a web service, or any other hardware and/or software combination. For example, the recommendation service 210 may be part of the context engine 202 or located as a cloud service accessible to the context engine 202 via a network (not shown) such as the Internet. In other embodiments, the context engine 202 is part of the recommendation service 210 and both elements, located in a cloud remote from the computing device 104, communicate with the computing device 104 via one or more networks.

The data sources include, for example, a search engine 212 (e.g., an Internet search engine), electronic mail websites 214 of accounts associated with the user 102, social networking websites 216, microblog websites 218, and other data sources 220 available to the recommendation service 210. The computing device 104, context engine 202, recommendation service 210, and data sources are connected via one or more of the following: peer-to-peer connections, cellular networks, the Internet, client-server connections, and any other form of networking or connection. Exemplary networks and connections include any wired and/or wireless network over which one or more protocols may be implemented.

Based on a particular time and location (e.g., provided by the computing device 104 directly or via the context engine 202), the recommendation service 210 searches the data sources to obtain one or more context items. The recommendation service 210 passes the context items as recommended context items to the context engine 202, or filters the context items before providing them to the context engine 202 (e.g., selects the most relevant context items).

The context engine 202 receives the recommended context items from the recommendation service 210. The context engine 202 may also search the user content to supplement or replace, partially or entirely, the recommended context items with context items obtained from the user content. The context engine 202 provides the context items to the computing device 104 for display to the user 102 at the particular time and location associated with the context items.

In the example of FIG. 2, the context engine 202 receives the context items from the data sources via the recommendation service 210. In other embodiments, however, the context engine 202 may communicate and interact directly with the data sources.

Figure 3:
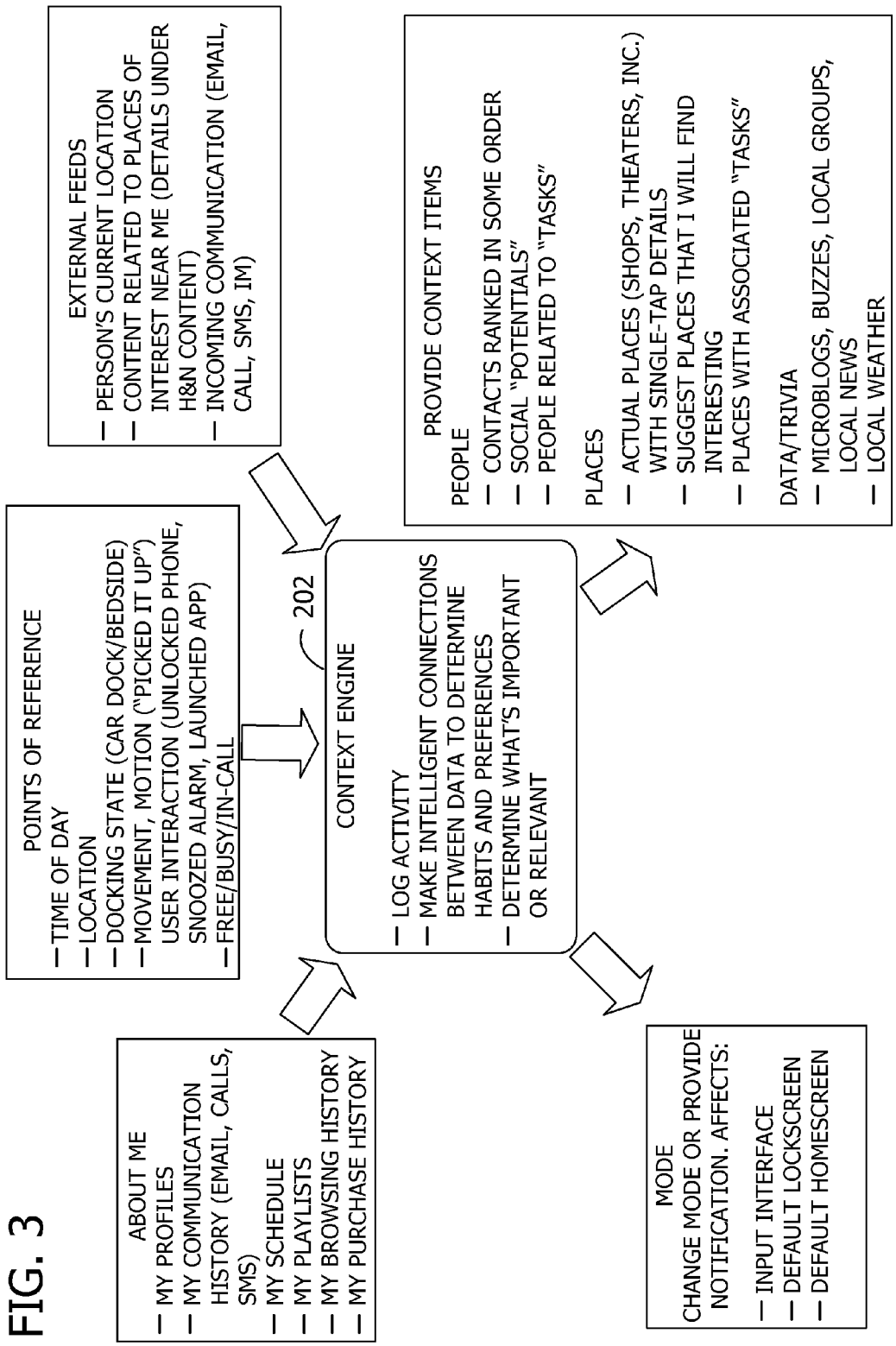
FIG. 3 is an exemplary block diagram illustrating input parameters and output from the context engine.

Referring next to FIG. 3, an exemplary block diagram illustrates input parameters and output from the context engine 202. In general, the context engine 202 obtains or receives input from various data stores and selects context items that are relevant to the user 102. In the example of FIG. 3, the context engine 202 receives context items that describe the user 102 (e.g., "About Me"), that describe the computing device 104 (e.g., "Points of Reference"), and that include data from external feeds.

The items that describe the user 102 are used to determine preferences of the user 102. For example, the context engine 202 analyzes topics or items that are discussed frequently in the communication history (e.g., via instant messages, microblog entries, e-mail messages, etc.) of the user 102. The context engine 202 may also analyze explicit feedback provided by the user 102, such as a thumbs-up or thumbs-down for a particular topic or item. In another example, the context engine 202 determines implicit feedback of the user 102 by analyzing how long the user 102 spends reviewing, discussing, or obtaining further information for particular topics or items.

From the "Points of Reference" context, aspects of the disclosure may obtain and provide content relating particular locations of the computing device 104. For example, when the computing device 104 passes a cinema or museum, the computing device 104 obtains and provides movie times or an exhibit overview, respectively, to the user 102. Aspects of the disclosure may further define a mobility pattern of the computing device 104. As an example, if the user 102 stops at a coffee shop every morning on the way to work, aspects of the disclosure recognize this pattern and leverage the pattern. The mobility pattern may be used to determine that the user 102 likes coffee and the coffee shop. If the context engine 202 subsequently detects one morning that the user's typical route has significant delays, the context engine 202 considers the user's preference for coffee and the coffee shop when proposing an alternative route to work (e.g., the route nearest another location of the coffee shop, or any coffee shop, may be selected). In a further example, the context engine 202 identifies newly-opened coffee shops along the user's typical route.

The input to the context engine 202 is the general context of the user 102 and/or the computing device 104, and represents external parameters as well as the state of the user 102 and/or computing device 104. The external parameters include time of day, current location, people who are nearby the computing device 104, and more. The state includes, for example, whether the user 102 is busy or free (e.g., based on calendar entries) and whether the user 102 is at work, driving, sleeping, or in social mode.

The context engine 202 analyzes the received input to determine context items that are relevant to the user 102 at a particular time and location of the computing device 104. Exemplary relevant context items include suggested activities such as visiting a museum, or content such a recent news story. The context engine 202 provides the relevant context items to the user 102 and/or changes the status or mode of the computing device 104. For example, the relevant context items are provided as part of various applications 110 executing on the computing device 104, or as notifications on a home screen or lock screen. In some embodiments, a change in status or mode of the computing device 104 affects operation and display of data to the user 102 on the computing device 104. As an example, the default view of the computing device 104 may change to a navigation application when the computing device 104 is determined to be moving at high speed.

In some embodiments, context items relating to work are displayed if the user 102 is determined to be at work, while such context items are not displayed if the user 102 is determined to be somewhere other than work. For example, if the user 102 is at work, the context engine 202 selects contacts of the user 102 who are scheduled to participate in an upcoming calendar appointment. The selected contacts are made available to the applications 110, displayed to the user 102 as a notification, featured at the top of the user's contact list, or other promoted to the user 102. In such an example, personal contacts and social networking feeds are demoted. In a further example, additional context items relevant to the upcoming calendar appointment are selected and surfaced by the context engine 202. Such additional context items may include e-mail, notes, or documents (e.g., related by keyword, author names that match participant names, or document creation time that approximates the calendar appointment creation time). Similarly, one or more of the applications 110 relevant to the upcoming calendar appointment may be highlighted or launched (e.g., a word processing application, scratchpad application, or dictation application).

As a further example, if the user 102 is determined to not be at work, the context engine 202 obtains or selects relevant context items based on nearby contacts, recent messages (inbound and outbound), upcoming birthdays or anniversaries of contacts. In such an example, the relevant context items include photos or messages relevant to the present location of the user 102 (e.g., a review by one of the contacts of a restaurant where the user 102 is presently located).

In some embodiments, the context engine 202 analyzes the communication history of the user 102 to propose a category or classification for each of the contacts. For example, the context engine 202 may propose that a particular contact be a work contact, family contact, or friend contact.

Figure 4:
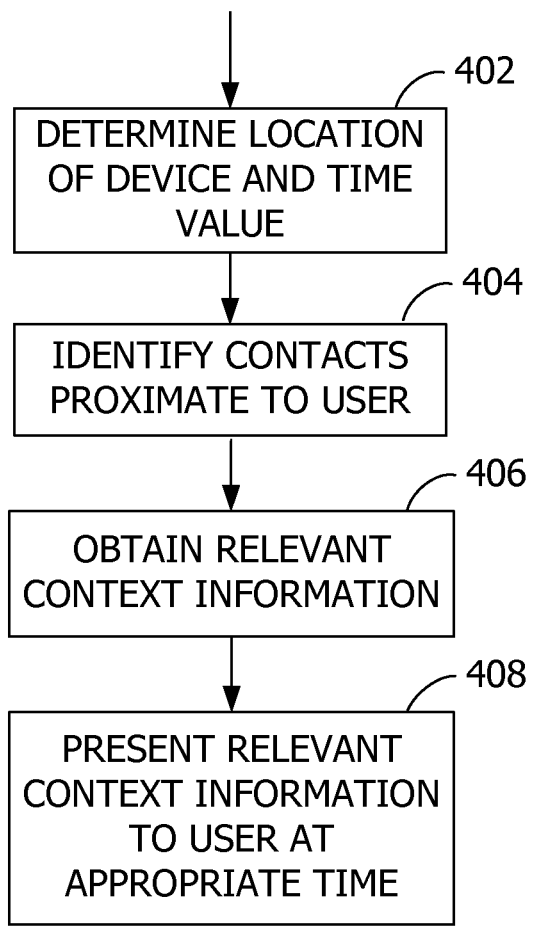
FIG. 4 is an exemplary flow chart illustrating operation of the computing device to provide a user with relevant context items.

Referring next to FIG. 4, an exemplary flow chart illustrates operation of the computing device 104 to provide the user 102 with relevant context items. At 402, a location of the computing device 104 of the user 102 is determined along with a time value associated with the location. The location may be latitude/longitude coordinates, a street address, city name, neighborhood name, retail establishment (e.g., restaurant, hotel, or store), and the like. In an embodiment, the determined location may be a location of the computing device 104 at a future time (e.g., where the computing device 104 is expected to be at the future time). The time value (e.g., the future time) associated with the location includes, for example, absolute and/or relative time value including one or more of the following: a current time, a future time, and a quantity of time units (e.g., seven hours from now, five minutes from now, ten minutes before the calendar appointment, etc.).

At 404, one or more contacts proximate to the computing device 104 are identified. For example, aspects of the disclosure determined whether a computing device of a colleague, friend, family member, or the like is near the computing device 104 of the user 102. The computing device 104 identifies the contacts via any means for detecting the presence of contacts including, for example, using network connections (e.g., BLUETOOTH communication services), presence status messages provided by the contacts to the computing device 104, etc.

At 406, relevant context information for the user 102 is obtained based at least on the determined location, time value, and identified contacts. For example, context information relating to one or more of the following data associated with the user 102 may be obtained: people (e.g., contacts), places (e.g., near the computing device 104), and content (e.g., images, music, video, notes, documents) The context information may be obtained from one or more of the following types of data: electronic mail messages, calendar entries, contact entries, text messages, content feeds, images, documents, and songs. As an example, if the location is at the city level, the relevant context information may include things to do, current events, tourist attractions, public transit information (e.g., nearby train stops), air fares, and the like. In another example, if the location is at the restaurant level, the relevant context information may include user ratings, reviews, and menu information. In yet another example, if the location is at the retail establishment, the relevant context information may include current deals, coupons, and a list of competing stores. In some embodiments, the relevant context items may include an ordering or ranking of the applications 110 available on the computing device 104. For example, the applications 110 may be ordered or promoted based on the determined location and time value such that the relevant applications are readily accessible by the user 102.

The relevant context information may include one or more items each having a weight value associated therewith. In some embodiments, the weight value represents a confidence factor and/or a degree of relevancy of the context item to the user 102. For example, if the relevant context items include two nearby restaurants, the restaurant closer to the identified location has a higher/greater weight value (e.g., indicating a greater degree of relevance to the user 102) than the other restaurant. In some embodiments, the weight values are calculated or otherwise determined by the computing device 104 (e.g., an operating system, service, and/or application executing on the computing device 104). Following the above example, the computing device 104 may compare a current location of the computing device 104 to the two nearby restaurants to determine the relative weight values (e.g., ranking) of each restaurant. In other embodiments, the computing device 104 determines the weight values based on explicit user preferences (e.g., the user 102 prefers coffee shops over fast food) or implicit user preferences (e.g., based on the user activity history).

In some embodiments, the context engine 202, computing device 104, or other element filters or otherwise selects items from the obtained context information to be provided to the computing device 104. For example, the filtering may occur based on the weight values to identify the more relevant items for presentation to the user 102.

At 408, the relevant (or filtered) context information is provided to the user 102 at a time corresponding to the determined time value (e.g., the "appropriate" time to provide the context information). For example, the computing device 104 displays or otherwise presents the relevant context information to the user 102. In some embodiments, the relevant context information is provided to the user 102 through one or more of the applications 110 executing on the computing device 104. The application(s) present the relevant context information to the user 102 at the time corresponding to the determined time value. In such embodiments, the application 110 may request that the context information be obtained. For example, an operating system, service, and/or application executing on the computing device 104 receives a request from the application 110 to obtain the context information.

In some embodiments, the application(s) may retrieve or otherwise access already-filtered context information (e.g., as stored in the memory area 108 or other data store local to or remote from the computing device 104). In the latter example, the context information is periodically updated (e.g., new context information is added, less relevant context information is removed) so that relevant context information is available to the applications 110 at any time.

The operations illustrated in FIG. 4 are performed at various times including, but not limited to, periodically, on demand by the user 102 or one or more of the applications 110, or responsive to notification that additional data sources or context information may be available to the computing device 104.

Figure 5:
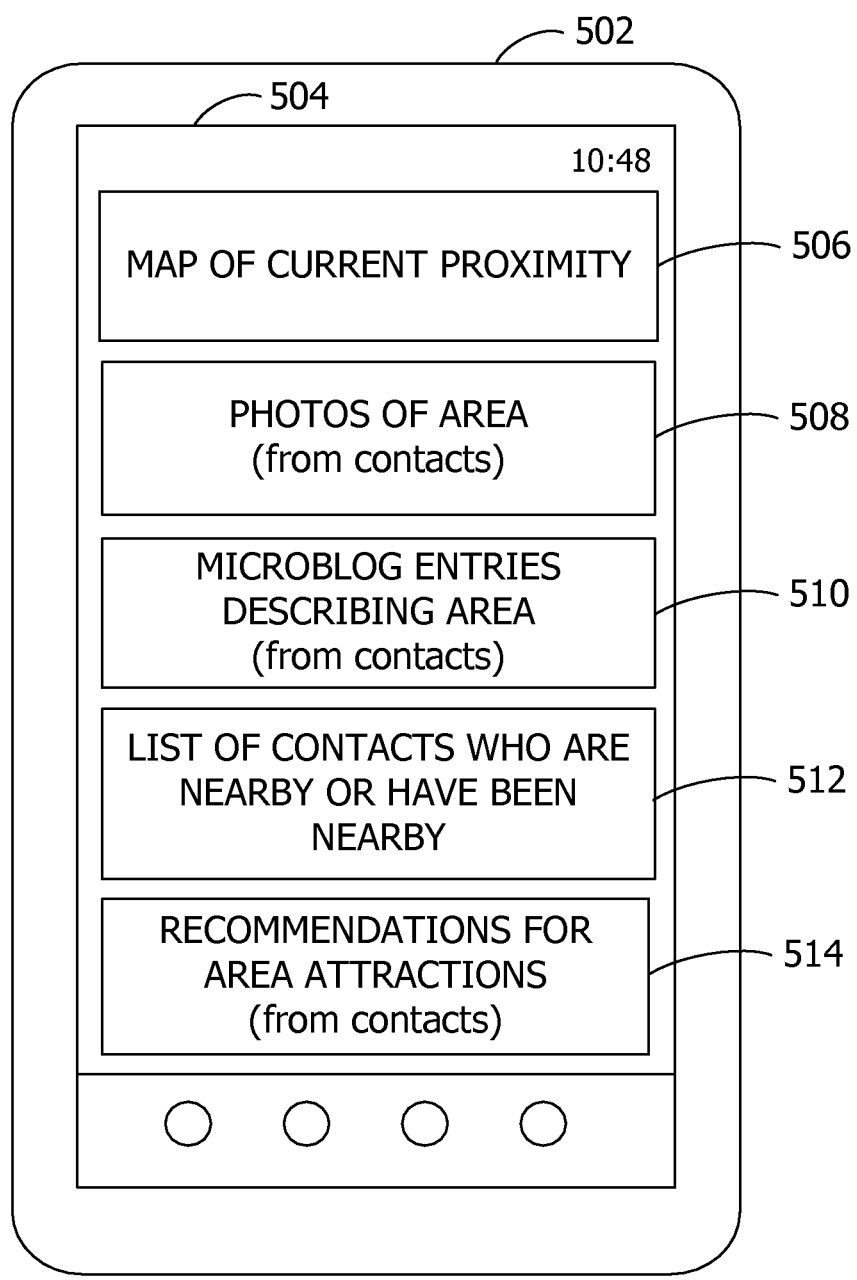
FIG. 5 is an exemplary mobile computing device with a user interface illustrating content relevant to a user while at a particular location.

Referring next to FIG. 5, an exemplary mobile computing device 502 with a user interface 504 illustrates content relevant to the user 102 while at a particular location. The relevant context information obtained by the mobile computing device 502 (e.g., per the operations illustrated in FIG. 4) may be organized in various ways for presentation to the user 102. For example, the context information may be organized for display in portions of the user interface 504 such as illustrated in FIG. 5. In the example of FIG. 5, a map of the current proximity or area (e.g., surrounding area or nearby the particular location of the mobile computing device 502) is displayed to the user 102 in portion 506. Photographs or other depictions of the surrounding area (e.g., from people designated as contacts of the user 102) are displayed in portion 508. Blog or microblog entries describing the surrounding area (e.g., from people designated as contacts of the user 102) are displayed in portion 510. A list of the contacts who are currently near the mobile computing device 502, or who have been near the area recently, is shown in portion 512. Recommendations (e.g., from contacts of the user 102) for attractions near the current area is shown in portion 514.

Other context information may be displayed to the user 102 in addition to or in place of the exemplary context information displayed in FIG. 5. Further, the exemplary context information displayed in FIG. 5 may be displayed through an application executing on the mobile computing device 502 or through an operating system of the mobile computing device 502. For example, the context information may be displayed on a home screen of the mobile computing device 502, as a notification, or through a lock screen of the mobile computing device 502.

Additional Examples

Aspects of the disclosure enable scenarios such as those next described. In an example scenario, if the user 102 is viewing a description of a particular location (e.g., a restaurant), the context engine 202 selects microblog entries and social networking updates (e.g., recently posted content on social networking websites) relating to the location as the relevant context information. Additionally, contacts who have expressed opinions of the location are surfaced. In another example, if the user 102 is visiting a mall, the stores may be displayed to the user 102 in order of expected relevance based on the user's explicit or implicit preferences (e.g., purchase history, past visits, etc.). In another scenario, the context engine 202 determines the most frequently used communication channels for each of the contacts and provides an ordered list of the channels to the user 102 when viewing the contacts.

The context items selected by the context engine 202 as relevant may include an aggregation, organization, classification, or categorizing of the contacts of the user 102. For example, if the user 102 is at work, the contacts may be organized into work contacts and personal contacts. The contacts may also be organized based on proximity to the computing device 104 and/or current status of each of the contacts (e.g., free/busy). If the user 102 is not at work, the contacts may be re-organized into groups based on relationship to the user 102. Exemplary groups include family contacts, gaming contacts, neighbor contacts, local friend contacts, and long-distance contacts.

At least a portion of the functionality of the various elements in the figures may be performed by other elements in the figures, or an entity (e.g., processor, web service, server, application program, computing device, etc.) not shown in the figures.

In some embodiments, each of the operations illustrated in FIG. 4 are performed by the same computing device. In other embodiments, one or more of the operations illustrated in FIG. 4 are performed by another computing device (e.g., as a web service). Further, the operations illustrated in FIG. 4 may be implemented as software instructions encoded on a computer-readable medium, in hardware programmed or designed to perform the operations, or both.

While embodiments have been described with reference to data collected from users, aspects of the disclosure provide notice to the users of the collection of the data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for obtaining and providing the context information to the user 102 at the time corresponding to the time value, and exemplary means for providing only the context information that is relevant to the user 102 at the time corresponding to the time value and while the mobile computing device 502 is in the determined location.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
   a memory area associated with a mobile computing device of a user, said memory area storing a plurality of applications; and
   a processor programmed to:
      receive a request for context information from at least one of the applications;
      determine a location of the mobile computing device and a time value associated with the determined location;
      identify one or more contacts proximate to the mobile computing device;
      obtain one or more items of context information for the user based at least on the determined location, time value, and identified contacts, wherein each of the items has a weight value associated therewith, each weight value representing a degree of relevancy of each of the one or more items of context information to the user at the determined location and time value;

filter the obtained items based on the weight values to identify items more relevant to the user of said at least one of the applications compared to other items;

provide the filtered items more relevant to the user of said at least one of the applications at a time corresponding to the time value;

order the at least one of the applications, provided with the filtered items more relevant to the user of said at least one of the applications, higher over one or more other applications on the mobile computing device based at least on the determined location and the time value;

promote, based on the context information, at least one of the identified contacts over other contacts in said at least one of the applications stored in the memory area; and provide, when providing the contacts for display, an ordered list of communication channels for each of the contacts based on a frequency of use of the communication channels.

2. The system of claim 1, wherein the processor is further programmed to change a status or mode of the mobile computing device based on the provided filtered items.

3. The system of claim 1, wherein the processor is further programmed to determine the weight values, the weight values being relative weight values determined by comparing the determined location of the mobile computing device with location information associated with the obtained items of context information.

4. The system of claim 1, wherein the processor is programmed to determine the weight values based on one or more of the following: explicit user preferences and inferred user preferences.

5. The system of claim 1, wherein the processor is programmed to provide the filtered items by storing the filtered items in the memory area, and wherein said at least one of the applications retrieves the filtered items from the memory area.

6. The system of claim 1, further comprising means for obtaining and providing the context information to the user at the time corresponding to the time value, wherein the context information is updated periodically and less relevant context information is removed.

7. The system of claim 1, further comprising means for providing only the context information that is relevant to the user at the time corresponding to the time value and while the mobile computing device is in the determined location.

8. A method comprising:
identifying a location of a computing device of a user;
determining a time value associated with the identified location;
filtering context information for the user based at least on the identified location and the determined time value;
providing the filtered context information to the user of at least one application at a time corresponding to the determined time value;
ordering the at least one application, provided with the filtered context information, higher over one or more other applications on the computing device based at least on the identified location and the determined time value;
identifying one or more contacts proximate to the computing device;
promoting, based on the provided filtered context information, at least one of the identified contacts over other contacts in at least one application available on the computing device; and
providing, when displaying the contacts, an ordered list of communication channels for each of the contacts based on a frequency of use of the communication channels.

9. The method of claim 8, wherein determining the time value comprises determining one or more of the following: a current time, a future time, and a quantity of time units.

10. The method of claim 8, wherein identifying the location of the computing device comprises identifying a location where the computing device is expected to be at a future time.

11. The method of claim 8, wherein the filtered context information comprises one or more items, and wherein each of the items has a weight value associated therewith.

12. The method of claim 11, further comprising filtering the context information based on the weight values to identify relevant items, and wherein providing the context information comprises providing the relevant items to the user.

13. The method of claim 8, wherein filtering the context information comprises filtering the context information based on one or more of the following: people, places, content, and sensors associated with the computing device.

14. The method of claim 13, further comprising obtaining the context information from one or more of the following: electronic mail messages, calendar entries, contact entries, text messages, content feeds, images, documents, and songs.

15. The method of claim 8, wherein providing the filtered context information to the user comprises providing the filtered context information to the application executing on the computing device, and wherein the application presents the filtered context information to the user at the time corresponding to the determined time value, the application comprising one or more of the following: a web browser, an applet, and a client portion of a web service.

16. The method of claim 8, further comprising obtaining the context information by searching one or more of the following: social networks and online data stores.

17. One or more computer storage media storing computer-executable components, said components comprising:
a calendar component that when executed by at least one processor of a computing device of a user causes the at least one processor to select a time value;
a positioning system component that when executed by at least one processor of the computing device causes the at least one processor to determine a location of the computing device at a time corresponding to the time value selected by the calendar component;
a sensor component that when executed by at least one processor of the computing device causes the at least one processor to collect data from one or more sensors associated with the computing device, the sensor component identifying one or more contacts proximate to the computing device;
a search engine component that when executed by at least one processor of the computing device causes the at least one processor to obtain context information for the user based at least on the time value selected by the calendar component, the location determined by the positioning system component, and the data collected by the sensor component; and
a user interface component that when executed by at least one processor of the computing device causes the at least one processor to present the context information obtained by the search engine component to the user only at a time corresponding to the selected time value and rank higher an application, associated with the context information obtained by the search engine component, over one or more other applications executing on the computing device based at least on the determined location and the selected time value, the application ranked higher being more relevant compared to the one or more other applications at the determined location and the selected time value, wherein the user interface component provides, when presenting the identified contacts, an ordered list of communication channels for each of the identified contacts based on a frequency of use of the communication channels.

18. The computer storage media of claim 17, wherein the calendar component selects the time value based on one or more of the following: an upcoming calendar entry and user activity history.

19. The computer storage media of claim 17, wherein the search engine component communicates with a web-based search engine to obtain the context information.

20. The computer storage media of claim 17, wherein the user interface component presents the context information to the user through the application, associated with the context information obtained by the search engine component, executing on the computing device, wherein the context information is related to the application.

* * * * *